United States Patent
Shibata (10) Patent No.: US 9,623,703 B2
(45) Date of Patent: Apr. 18, 2017

(54) WHEEL BEARING APPARATUS FOR A VEHICLE

(71) Applicant: NTN Corporation, Osaka-shi (JP)

(72) Inventor: Yasushi Shibata, Iwata (JP)

(73) Assignee: NTN Corporation, Osaka-shi (JP)

( * ) Notice: Subject to any disclaimer, the term of this patent is extended or adjusted under 35 U.S.C. 154(b) by 209 days.

(21) Appl. No.: 14/452,881

(22) Filed: Aug. 6, 2014

(65) Prior Publication Data

US 2014/0346850 A1 Nov. 27, 2014

Related U.S. Application Data

(63) Continuation of application No. PCT/JP2013/052767, filed on Feb. 6, 2013.

(30) Foreign Application Priority Data

Feb. 7, 2012 (JP) ................... 2012-024126

(51) Int. Cl.
*B60B 27/00* (2006.01)
*F16C 33/66* (2006.01)
(Continued)

(52) U.S. Cl.
CPC ...... *B60B 27/0073* (2013.01); *B60B 27/0005* (2013.01); *F16C 33/6633* (2013.01);
(Continued)

(58) Field of Classification Search
CPC ............. B60B 27/0073; B60B 27/0005; F16C 33/7873; F16C 33/6633; F16C 33/7879; F16C 33/7826; F16J 15/324
See application file for complete search history.

(56) References Cited

U.S. PATENT DOCUMENTS

2005/0226545 A1* 10/2005 Ohtsuki ................. B60B 27/00
384/448
2005/0254741 A1* 11/2005 Norimatsu ............. B60B 27/00
384/544

(Continued)

FOREIGN PATENT DOCUMENTS

JP   2004-353710   12/2004
JP   2006-083878   3/2006
(Continued)

*Primary Examiner* — Kip T Kotter (74) *Attorney, Agent, or Firm* — Harness, Dickey & Pierce, P.L.C.

(57) ABSTRACT

A vehicle wheel bearing apparatus has an outer member, an inner member, double row rolling elements, and seals. At least one seal of the seals has a metal core press-formed from steel sheet with a cylindrical fitting portion. A radial portion extends radially inward from the end of the fitting portion. A sealing member with a plurality of sealing lips is integrally adhered to the fitting portion of the metal core. Bearing grease is contained within the bearing. Sealing grease is applied to the sealing lips. Both the bearing grease and the sealing grease use the same thickener and the worked penetration of 350 or less. The kinematic viscosity of the base oil of the sealing grease at 40° C. is set to 70% or less of the kinematic viscosity of the base oil of the bearing grease at 40° C.

10 Claims, 4 Drawing Sheets

(51) Int. Cl.
 F16C 33/78 (2006.01)
 F16J 15/324 (2016.01)
 F16C 19/18 (2006.01)
 C10M 169/02 (2006.01)
 C10M 115/08 (2006.01)

(52) U.S. Cl.
 CPC ...... *F16C 33/7826* (2013.01); *F16C 33/7873* (2013.01); *F16C 33/7879* (2013.01); *F16J 15/324* (2013.01); *B60B 27/00* (2013.01); *B60B 2380/73* (2013.01); *B60B 2900/321* (2013.01); *B60B 2900/511* (2013.01); *B60B 2900/561* (2013.01); *C10M 115/08* (2013.01); *C10M 169/02* (2013.01); *C10M 2203/1006* (2013.01); *C10M 2207/1256* (2013.01); *C10M 2215/1026* (2013.01); *C10N 2210/01* (2013.01); *C10N 2220/022* (2013.01); *C10N 2230/06* (2013.01); *C10N 2250/10* (2013.01); *F16C 19/186* (2013.01); *F16C 2326/02* (2013.01)

(56) References Cited

U.S. PATENT DOCUMENTS

| | | | |
|---|---|---|---|
| 2007/0206892 A1* | 9/2007 | Iso | C10M 171/02 384/462 |
| 2008/0044120 A1* | 2/2008 | Komori | B60B 27/0005 384/477 |
| 2009/0058011 A1* | 3/2009 | Shibayama | B60B 27/0005 277/361 |
| 2009/0085299 A1* | 4/2009 | Shibayama | B60B 27/0005 277/349 |
| 2009/0136170 A1* | 5/2009 | Sato | C10M 169/02 384/462 |
| 2010/0061671 A1* | 3/2010 | Norimatsu | B60B 27/0005 384/448 |
| 2010/0232734 A1* | 9/2010 | Torii | B60B 27/0005 384/481 |
| 2011/0049009 A1* | 3/2011 | Tagawa | C10M 107/02 208/18 |
| 2011/0136578 A1 | 6/2011 | Kawamura | |
| 2011/0262069 A1* | 10/2011 | Baba | B60B 27/0073 384/486 |

FOREIGN PATENT DOCUMENTS

| | | |
|---|---|---|
| JP | 2008-025668 | 2/2008 |
| JP | 2010-084142 | 4/2010 |
| JP | 2010-159791 | 7/2010 |
| JP | 2011-069422 | 4/2011 |
| JP | 2011-185342 | 9/2011 |
| WO | WO2010/079734 | 7/2010 |

* cited by examiner

PRIOR ART

WHEEL BEARING APPARATUS FOR A VEHICLE

CROSS-REFERENCE TO RELATED APPLICATIONS

This application is a continuation of International Application No. PCT/JP2013/052767, filed Feb. 6, 2013, which claims priority to Japanese Application No. 2012-024126, filed Feb. 7, 2012. The disclosures of the above applications are incorporating herein by reference.

FIELD

The present disclosure relates to a vehicle wheel bearing apparatus that rotationally supports a wheel of vehicle relative to a suspension apparatus.

BACKGROUND

In general, the wheel bearing apparatus can rotationally support a wheel hub, mounting a wheel, via double row rolling bearings and are classified as a driving wheel and a driven wheel. For structural reasons, an inner ring rotation type wheel bearing apparatus is used for the driving wheel. Both the inner ring rotation type and outer ring rotation type are used for the driven wheel. In general, the wheel bearing apparatus is classified as a so-called first, second, third and fourth generation type. In a first generation type, the wheel bearing has double row angular-contact ball bearings fit between the knuckle and the wheel hub. The second generation type has a body mounting flange or a wheel mounting flange integrally formed on the outer circumference of an outer member. The third generation type has one of inner raceway surfaces directly formed on the outer circumference of a wheel hub. The fourth generation type has inner raceway surfaces directly formed on the outer circumferences, respectively, of the wheel hub and the outer joint member of a constant velocity universal joint.

The wheel bearing apparatus is provided with seals to prevent leakage of grease contained within the bearing apparatus and entry of rain water or dust from the outside into the bearing apparatus. Recently, it is desirable for the bearing apparatus to have a long durability along with a tendency of maintenance-free operation in the automobile. Under many circumstances, it has been proved that sealing trouble in the bearing apparatus, due to entry of rain water or dust into the bearing, leads to failure rather than peeling or breakage of structural elements of the bearings. Accordingly, it is very important to improve the sealability of the bearing apparatus in order to extend its life.

Recently, governments have required improve fuel consumption in view of energy saving and polluting of the global environment. Accordingly, it is important to reduce the rotational torque of the wheel bearing apparatus. In the wheel bearing apparatus, the sliding resistance of the sealing apparatus is predominant over the rolling resistance of the rolling elements (balls or tapered rollers). Thus, it is possible to reduce the rotational torque of the wheel bearing apparatus by suppressing the sliding resistance of the sealing apparatus.

Figure 5:
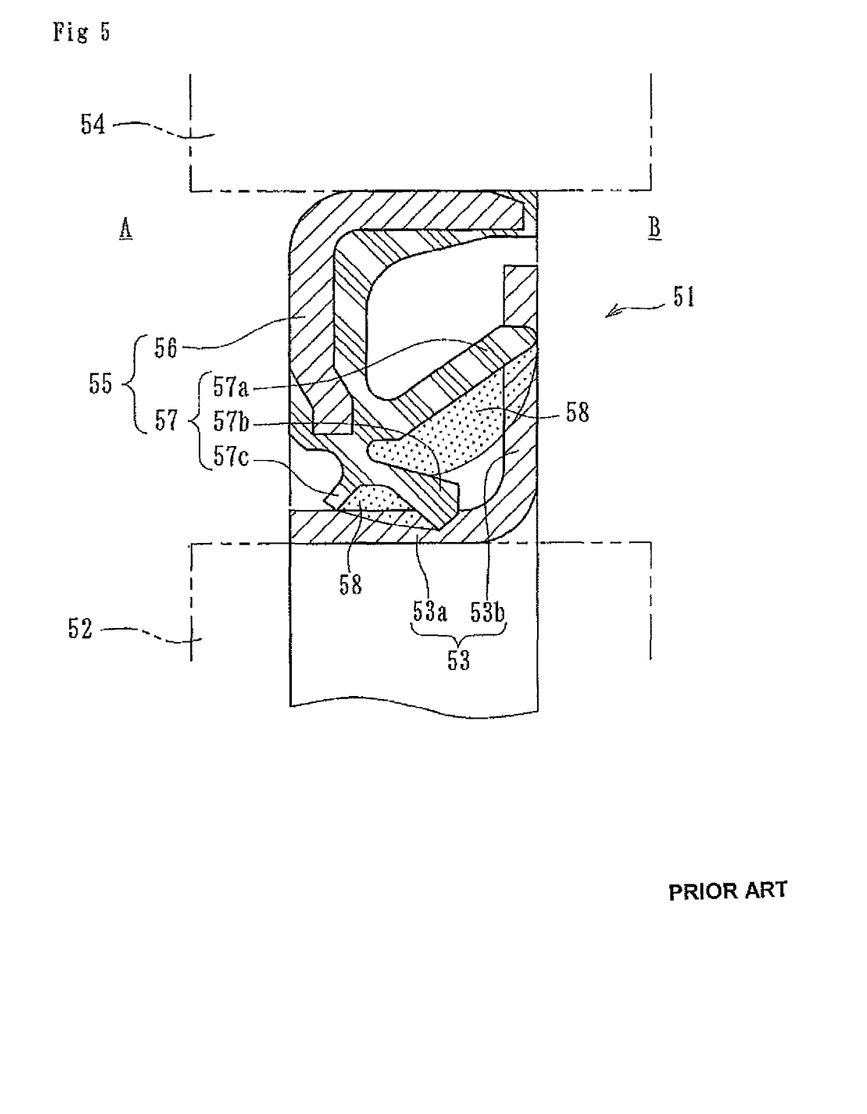
FIG. 5 is a partially enlarged view of an inner-side seal of a prior art vehicle wheel bearing apparatus.

A variety of sealing apparatus that improves sealability and reduce the rotational torque has been proposed. One example is shown in FIG. 5. This inner-side sealing apparatus 51 includes a slinger 53 adapted to be fit onto an inner member 52. A seal main body 55 is adapted to be fit into an outer member 54. The slinger 53 includes a cylindrical fitting portion 53a adapted to be fit onto the inner member 52. A standing portion 53b extends radially outward from the fitting portion 53a. In addition, the seal main body 55 has a metal core 56 adapted to fit into the outer member 54. A sealing member 57 is secured on the metal core 56. The sealing member 57 also includes a main lip 57b, a sub-lip 57c and side lip 57a closely contacted with a slinger 53.

Sealing lubricant (i.e. sealing grease) 58 is contained in a sealed manner in spaces between the side lip 57a, the main lip 57b and the slinger as well as between the main lip 57b, the sub-lip 57c and the slinger. When the seal main body 55 is assembled to the slinger 53, the tip end of the main lip 57b is directed to the outside "B" of the bearing. The main lip 57b contacts the surface of the fitting portion 53a of the slinger 53. The tip end of the sub-lip 57c is directed toward the inside "A" of the bearing. The sub-lip 57c contacts with the surface of the fitting portion 53a of the slinger 53. This makes it possible to prevent bearing lubricant (i.e. bearing grease), contained in the bearing, from leaking outside "B" of the bearing. On the other hand, the tip end of the side lip 57a is directed radially outward. The side lip 57a contacts the surface of the standing portion 53b of the slinger 53. This makes it possible to prevent the entry of foreign material, such as muddy water, from the outside "B" to the inside "A" of the bearing.

The sealing grease 58 is contained in spaces between the side lip 57a, the main lip 57b and the slinger 53 as well as between the main lip 57b, the sub-lip 57c and the slinger 53. The sealing grease 58 has kinematic viscosity of its base oil of 20~65 mm$^2$/s, preferably 20~25 mm$^2$/s at 40° C. and worked penetration of 220~280, preferably 240~260. In this case, if the kinematic viscosity of base oil is less than 20 mm$^2$/s and the worked penetration exceeds 280, the flowability of the sealing grease 58 will be high. Thus, the sealing grease 58 would leak from the sliding surfaces of the slinger 53. On the contrary, if the kinematic viscosity of base oil exceeds 65 mm$^2$/s and the worked penetration is less than 220, the apparent viscosity of the sealing grease 58 will be high. Thus, the frictional torque of the sealing lips 58 would be undesirably increased. If the worked penetration exceeds 280, the softness of the sealing grease 58 will be high. Thus, the sealing grease 58 would leak from the sliding surfaces of the slinger 53.

In the sealing apparatus 51, the main lip 57b, sub-lip 57c and side lip 57a closely contact the slinger 53 fit onto the inner member 52. Thus, it is possible to prevent leakage of the bearing grease from the inside "A" of the bearing and entry of foreign matter, such as muddy water, to the inside "A" of the bearing from the outside "B". In addition, the sealing grease 58 is contained in a sealing manner in spaces between the side lip 57a and the main lip 57b as well as between the main lip 57b and the sub-lip 57c. The sealing grease has the kinematic viscosity of its base oil of 20~65 mm$^2$/s at 40° C. and the worked penetration of 220~280. Thus, it is possible to reduce the frictional torque and accordingly the rotational torque of the sealing apparatus 51 (see, JP 2008-25668 A).

However, it is important to prevent reduction of the endurance life of the bearing due to lubrication defects of the bearing grease sealed in the bearing. Although the sealing grease 58, sealed in the sealing apparatus 51, may be different from the bearing grease sealed in the bearing, sometimes quality degradation problems are caused by both the bearing grease and the sealing grease due to the mixture of them together. Thus, it is important to select the best characteristics and combinations of both the bearing grease and the sealing grease that do not cause the above described problems.

SUMMARY

It is an object of the present disclosure to provide a wheel bearing apparatus that can reduce frictional torque of the sealing lips and thus reduce the rotational torque of the sealing apparatus. Accordingly, by selecting the best characteristics and combinations of both the bearing grease and the sealing grease can prevent mixture of them by suppressing their flowability.

To achieve the object of the present disclosure, a vehicle wheel bearing apparatus comprises an outer member, inner member, double row rolling elements and seals. The outer member inner circumference has double row outer raceway surfaces. The inner member includes a wheel hub and at least one inner ring. The wheel hub is integrally formed on one end with a wheel mounting flange. A cylindrical portion axially extends from the wheel mounting flange. The inner ring is press-fit onto the cylindrical portion of the wheel hub. Double row inner raceway surfaces are formed on the outer circumference of the wheel hub and the inner ring. The inner raceway surface opposes, respectively, the double row outer raceway surfaces. Double row rolling elements are freely rollably contained between the inner raceway surfaces of the inner member and the outer raceway surfaces of the outer member. The seals are mounted within annular openings formed between the outer member and the inner member. At least one seal of the seals comprises a metal core press-formed from a steel sheet. The at least one seal has a cylindrical fitting portion adapted to be press-fit into the inner circumference of the end of the outer member, via a predetermined interference. A radial portion extends radially inward from the end of the fitting portion. A sealing member, of synthetic rubber, is formed with a plurality of sealing lips. The sealing member is integrally adhered to the fitting portion of the metal core by vulcanizing adhesion. Bearing grease is contained within the bearing in a sealed manner. Sealing grease is applied to the sliding portions of the sealing lips. Both the bearing grease and the sealing grease use the same thickener and the worked penetration of 350 or less. The kinematic viscosity of a base oil of the sealing grease at 40° C. is set to 70% or less than that of the bearing grease at 40° C.

The vehicle wheel bearing apparatus has at least one seal of the seals with a metal core and a sealing member. The metal core is press-formed from steel sheet. The metal core has a cylindrical fitting portion adapted to press-fit into the inner circumference of the end of the outer member, via a predetermined interference. A radial portion extends radially inward from the end of the fitting portion. The sealing member, of synthetic rubber, is formed with a plurality of sealing lips. The sealing member is integrally adhered to the fitting portion of the metal core by vulcanizing adhesion. Bearing grease is contained within the bearing in a sealed manner. Sealing grease is applied to the sliding portions of the sealing lips. Both the bearing grease and the sealing grease use the same thickener and the worked penetration of 350 or less. The kinematic viscosity of the base oil of the sealing grease at 40° C. is set to 70% or less of that of the bearing grease at 40° C. Thus, it is possible to provide a wheel bearing apparatus that can reduce frictional torque of the sealing lips. Thus, it also reduces the rotational torque of the sealing apparatus by selecting the best characteristics and combinations of both the bearing grease and the sealing grease. This can prevent the mixture of the bearing grease and sealing grease by suppressing their flowability.

The bearing grease comprises urea-base thickener. The kinematic viscosity of base oil of the bearing grease at 40° C. is set to a range of 30~470 mm$^2$/s.

The pour point of base oil of the sealing grease is adjusted to a range of −65~−12.5° C. This makes it possible to suppress an increase of starting torque of the seal due to high viscosity or solidification of base oil at a temperature below the freezing point.

The pour point of base oil is adjusted by mixing mineral oil and synthetic oil. The pour point of base oil is adjusted by adding pour point depressant to the base oil.

The saturated moisture of the sealing grease is set to a range of 30~60% by weight. This makes it possible to obtain high oil film formation even when the sealing grease is moisturized. Thus, this reduces the frictional torque of the sealing lips for a long term without causing sliding degradation.

Mating surfaces that engage the sealing lips are roughened to a maximum height Rz 5~20 (JIS B 0601-2001). This makes it possible to increase grease holding power due to an increase of surface area. Thus, this reduces the rotational torque due to an improvement of lip lubrication and a reduction of lip sliding resistance.

Mating surfaces that engage the sealing lips are formed with innumerable dimples by a shot blast treatment. They are roughened to a range of maximum height Rz 1~9 (JIS B 0601-2001). This makes it possible to increase grease holding power due to an increase of the surface area by the dimples. Thus, this improves the sealability and durability of the seal for a long term due to suppression of wear of sealing lips and heat generation of lip sliding portions.

The sealing member is adhered to the metal core so that it covers the external surface of the metal core from its radial portion to fitting portion. The sealing member also forms an annular projection. The annular projection has an outer diameter gradually increasing toward the outer-side end of the outer member. Thus, it has a tapered outer surface of a predetermined inclined angle. Also, the annular projection has a predetermined projected height slightly larger than the outer diameter of the fitting portion of the metal core. This makes it possible to improve the interference effect while reducing press-fitting resistance. Thus, this protects the inside of the bearing while improving the sealability of the fitting portion. Additionally, it improves the reliability of the bearing while preventing damage to the sealing member during press-fitting.

The inner-side tip end of the fitting portion of the metal core is thinned. The sealing member is adhered to the metal core so that it covers the external surface of the metal core from its radial portion to fitting portion. This makes it possible to improve the interference effect and thus protects the inside of the bearing while improving the sealability of the fitting portion.

The vehicle wheel bearing apparatus comprises an outer member, inner member, rolling elements and seals. The outer member inner circumference is formed with double row outer raceway surfaces. The inner member includes a wheel hub and at least one inner ring. The wheel hub is integrally formed on one end with a wheel mounting flange. A cylindrical portion axially extends from the wheel mounting flange. The inner ring is press-fit onto the cylindrical portion of the wheel hub. Double row inner raceway surfaces are formed on the outer circumferences of the wheel hub and the inner ring. The inner raceway surfaces oppose the double row outer raceway surfaces. Double row rolling elements are freely rollably contained between the inner raceway surfaces of the inner member and the outer raceway surfaces of the outer member. The seals are mounted within annular openings formed between the outer member and the inner member. At least one seal, of the seals, comprises a metal core and a sealing member. The metal core is press-formed from a steel sheet. The metal core has a cylindrical fitting portion adapted to be press-fit into the inner circumference of the end of the outer member, via a predetermined interference. A radial portion extends radially inward from the end of the fitting portion. The sealing member, of synthetic rubber, is formed with a plurality of sealing lips. The sealing member is integrally adhered to the fitting portion of the metal core by vulcanizing adhesion. Bearing grease is contained within the bearing in a sealed manner. Sealing grease is applied to the sliding portions of the sealing lips. Both the bearing grease and the sealing grease use the same thickener and the worked penetration is 350 or less. The kinematic viscosity of base oil of the sealing grease at 40° C. is set to 70% or less of that of the bearing grease at 40° C. Thus, it is possible to provide a wheel bearing apparatus that can reduce frictional torque of the sealing lips and thus reduce the rotational torque of the sealing apparatus while selecting the best characteristics and combinations of both the bearing grease and the sealing grease that can prevent the mixture of the bearing grease and sealing grease by suppressing their flowability.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A vehicle wheel bearing apparatus comprises an outer member, inner member, rolling elements and seals. The outer member outer circumference has a body mounting flange to be mounted on a body of a vehicle. The outer member inner circumference has double row outer raceway surfaces. The inner member includes a wheel hub and at least one inner ring. The wheel hub is integrally formed on its one end with a wheel mounting flange. A cylindrical portion axially extends from the wheel mounting flange. The inner ring is press-fit onto the cylindrical portion of the wheel hub. Double row inner raceway surfaces are formed on the outer circumferences of the wheel hub and the inner ring. The inner raceway surfaces oppose, respectively, the double row outer raceway surfaces. Double row rolling elements are freely rollably contained between the inner raceway surfaces of the inner member and the outer raceway surfaces of the outer member. The seals mount within annular openings formed between the outer member and the inner member. At least one seal of the seals comprises an annular sealing plate and a slinger. Each has a substantially L-shaped cross-section. They are oppositely arranged toward each other. The sealing plate includes a metal core adapted to be press-fit into the inner circumference of the end of the outer member. A sealing member is integrally adhered to the metal core by vulcanizing adhesion. Bearing grease is contained within the bearing in a sealed manner. Sealing grease is applied to the sliding portions of the sealing lips. Both the bearing grease and the sealing grease use the same thickener and the worked penetration of 350 or less. The kinematic viscosity of the base oil of the sealing grease at 40° C. is set to 70% or less of that of the bearing grease at 40° C.

A preferred embodiment of the present disclosure will be hereinafter described with reference to the drawings.

Figure 1:
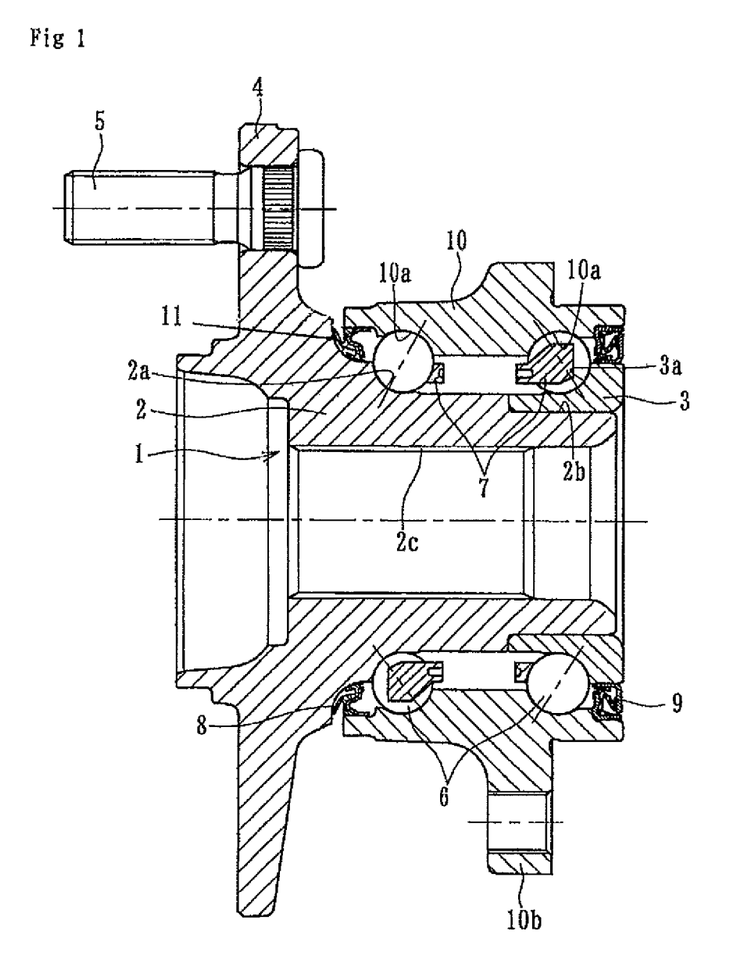
FIG. 1 is a longitudinal section view of a preferred embodiment of the vehicle wheel bearing apparatus.
Figure 2:
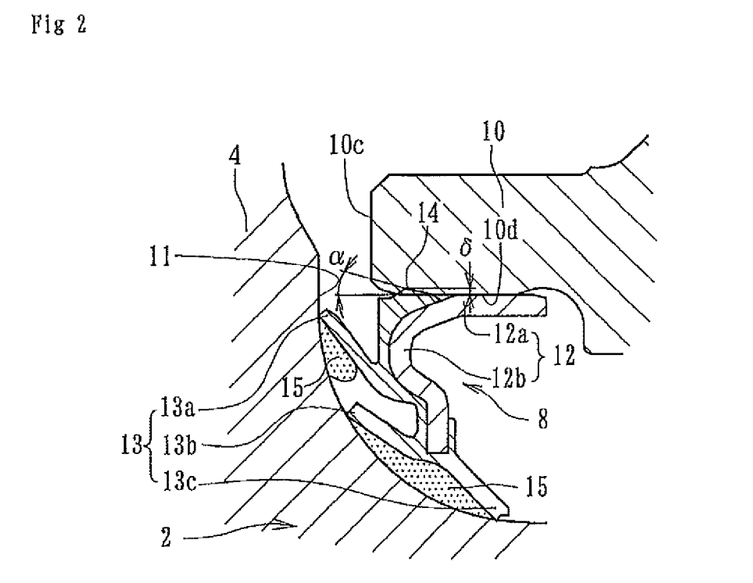
FIG. 2 is a partially enlarged view of an outer-side seal of FIG. 1.
Figure 3:
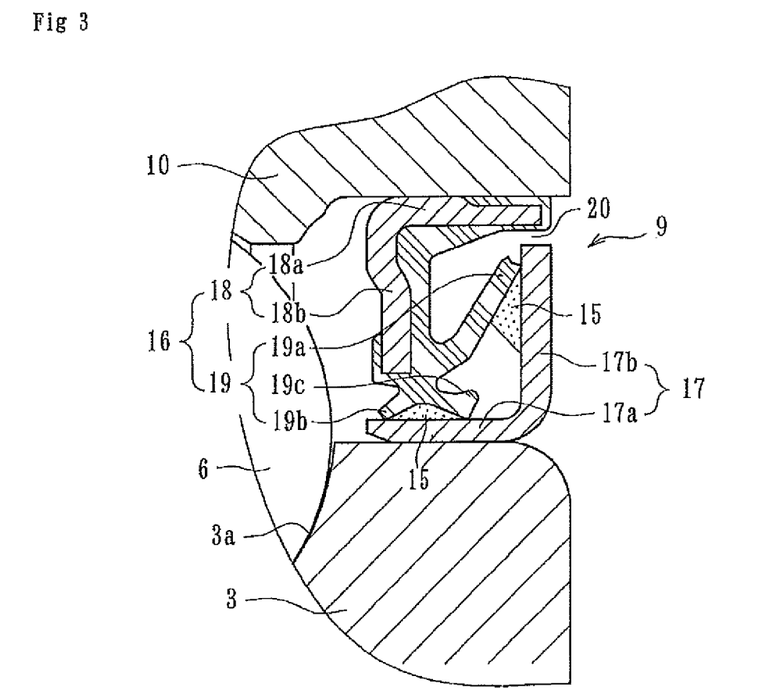
FIG. 3 is a partially enlarged view of an inner-side seal of FIG. 1.

FIG. 1 is a longitudinal section view of one preferred embodiment of the vehicle wheel bearing apparatus. FIG. 2 is a partially enlarged view of an outer-side seal of FIG. 1. FIG. 3 is a partially enlarged view of an inner-side seal of FIG. 1. FIG. 4(a) is an explanatory partially enlarged sectional view of a slinger of FIG. 3. FIG. 4(b) is an explanatory partially enlarged view taken along an arrow IVb in FIG. 4(a). FIG. 4(c) is an explanatory partially enlarged view taken along an arrow IVc in FIG. 4(a). In the description in this specification when the bearing apparatus is mounted on a vehicle body, the term "outer-side" defines a side that is positioned outside of a vehicle body (left-hand side in drawings) and the term "inner-side" defines a side that is positioned inside of a vehicle body (right-hand side in drawings).

The illustrated wheel bearing apparatus of the present disclosure is a so-called "third generation" type for a driving wheel. It includes an inner member 1, an outer member 10, and double row rolling elements (balls) 6, 6 contained between the inner and outer members 1, 10. The inner member 1 includes a wheel hub 2 and an inner ring 3 press-fit onto the wheel hub 2.

The wheel hub 2 is integrally formed, on its outer-side end, with a wheel mounting flange 4. The wheel mounting flange 4 mounts a wheel (not shown). Hub bolts 5 are equidistantly circumferentially mounted on the wheel mounting flange 4. The wheel hub 2 is integrally formed, on its outer circumference, with one (outer-side) inner raceway surface 2a. A cylindrical portion 2b axially extends from the inner raceway surface 2a. The wheel hub 2 is also formed, on its inner circumference, with a serration (or spline) 2c for torque transmission. The inner ring 3 is formed, on its outer circumference, with the other (inner-side) inner raceway surface 3a. The inner ring 3 is press-fit onto the cylindrical portion 2b of the wheel hub 2 via a predetermined interference.

The wheel hub 2 is formed of medium-high carbon steel such as S53C including carbon of 0.40~0.80% by weight. It is hardened by high frequency induction hardening to have a surface hardness of 58~64 HRC over a region from an inner-side base portion 11 of the wheel mounting flange, forming a mating surface (seal land portion) of a seal 8 (described later), to the cylindrical portion 2b through the outer-side inner raceway surface 2a. This applies sufficient mechanical strength to the wheel hub 2 against rotary bending loaded on the wheel mounting flange 4. Thus, this improves the strength and durability of the wheel hub 2. The inner ring 3 and rolling elements 6 are formed of high carbon chrome steel such as SUJ2. They are dip hardened to their cores to have a hardness of 58~64 HRC.

The outer member 10 is formed with a body mounting flange on its outer circumference. The body mounting flange 10b is to be mounted on a body (not shown) of a vehicle. The outer member inner circumference includes double row outer raceway surfaces 10a, 10a. The outer raceway surfaces 10a, 10a oppose the inner raceway surfaces 2a, 3a of the inner member 1.

Similarly to the wheel hub 2, the outer member 10 is formed of medium-high carbon steel such as S53C including carbon of 0.40~0.80% by weight. It is hardened by high frequency induction hardening to have a surface hardness of 58~64 HRC.

The double row rolling elements 6, 6 are rollably contained in an annular space between the inner raceway surfaces 2a, 3a and the outer raceway surfaces 10a, 10a. The rolling elements 6, 6 are freely rollably held by cages 7, 7. Seals (i.e. an inner-side seal 9 and an outer-side seal 8) are mounted in annular openings formed between the outer member 10 and inner member 1 at both ends. The seals 9, 10 close and seal the annular openings. This prevents leakage of bearing grease contained in the bearing in a sealed manner and entry of rain water or dust from the outside of the bearing into the inside of the bearing.

Although the wheel bearing apparatus is shown here with a double row angular contact ball bearing using balls as the rolling elements 6, the present disclosure is not limited to such a bearing. Thus, a double row tapered roller bearing using tapered rollers as rolling elements 6 may be used. In addition, although it is shown here as a third generation type, where the inner raceway surface 2a is directly formed on the wheel hub 2, the present disclosure may be applied to the first and second generation bearing types with a pair of inner rings press-fit onto a cylindrical portion of a wheel hub.

As shown in FIG. 2, the outer-side seal 8 is formed as an integrated seal with a metal core 12 and a sealing member 13. The sealing member 13 is integrally adhered to the metal core 12, via vulcanizing adhesion. The metal core 12 is press-formed from steel plate such as a ferritic stainless steel sheet (JIS SUS 430 etc.), an austenitic stainless steel sheet (JIS SUS 304 etc.) or preserved cold rolled steel sheet. It has a substantially L-shaped longitudinal section. A cylindrical fitting portion 12a is press-fit into the inner circumference 10d of the outer member 10, via a predetermined interference. A radial portion 12b extends radially inward from the end of the fitting portion 12a. The sealing member 13 is adhered to the metal core 12 so that it covers the external surface of the metal core 12 from its radial portion 12b to fitting portion 12a and forms an annular projection 14.

The annular projection 14 has an outer diameter gradually increasing toward the outer-side end 10c of the outer member 10. Thus, it has a tapered outer surface of a predetermined inclined angle α. Also, it has a predetermined projected height δ slightly larger than the outer diameter of the fitting portion 12a of the metal core 12. The projection 14 is press-fit into the inner circumference 10d of the outer member 10 via a predetermined interference. In this case, it is possible to prevent the generation of damage in the rubber of the sealing member 13 during the press-fitting by previously applying grease on the surface of the sealing member 13.

The inclined angle α of the annular projection 14 is set in a range of 5~15°. The projected height δ is in a range of 0.25~0.30 mm. Thus, it is possible to provide a wheel bearing apparatus that can improve the interference effect while reducing press-fitting resistance. Thus, this protects the inside of the bearing while improving the sealability of the fitting portion and additionally improves the reliability of the bearing while preventing damages of the sealing member 13 during press-fitting.

In this case, if the inclined angle α exceeds 15°, it is believed that any damage would be caused in the sealing member 13. Contrary, if the inclined angle α is less than 5°, the effects of the annular projection 14 would be reduced to half. In addition, if the projected height δ exceeds 0.30 mm, resistance of press-fitting will be increased and damage would be caused to the sealing member 13. Contrary, if the projected height δ is less than 0.25 mm, the sealing effect would be reduced.

The sealing member 13 is formed of synthetic rubber such as NBR (acrylonitrile-butadiene rubber). The sealing member has a side lip 13a and a dust lip 13b that angularly extend radially outward. The side lip 13a and dust lip 13b are in sliding contact with the base portion 11 of the wheel mounting flange 4. The wheel mounting flange 4 is formed with a circular arc longitudinal section. A grease lip 13c angularly extends toward inside of the bearing. Materials for the sealing member 13 other than NBR may be used. Such materials are HNBR (hydrogenation acrylonitric-butadiene rubber), EPDM (ethylene propylene rubber), ACM (polyacrylic rubber), and FKM (fluororubber) or silicone rubber which are superior in heat and chemical resistance.

In Tables 1 and 2 below, the "bearing grease" sealed within the bearing is designated by a character "A". Two kinds of the "sealing grease" are applied and held in spaces between the side lip 13a and the dust lip 13b as well as between the dust lip 13b and the grease lip 13c. They are designated respectively by characters "B" and "C". Experiments were performed to confirm effects of torque reduction and bearing life using the bearing grease "A" with the kinematic viscosity of base oil of 30~170 mm$^2$/s at 40° C. and the worked penetration of 270~300. The sealing greases "B", "C" have specifications shown in Table 1. It has been confirmed that the rotational torque can be reduced by setting the kinematic viscosity of base oil of the sealing grease "B" at 40° C. to 70% or less than that of the bearing grease "A". However, in case of the sealing grease "C" using different thickener, it has confirmed that the rotational torque was reduced but the bearing life was inferior to that of a bearing of current specifications.

TABLE 1

| Name of grease | A | B | C |
|---|---|---|---|
| Base oil | Mineral oil | Mineral oil | Mineral oil |
| Kinematic viscosity of base oil (mm$^2$/s) | 30~170 | 20~45 | ← |
| Thickener | Urea | ← | Lithium |
| Worked penetration | 270~300 | 250~320 | ← |

TABLE 2

| Bearing grease | Sealing grease | Torque | Endurance life | Remarks |
|---|---|---|---|---|
| A | A | Moderate | Moderate | Current specifications |

TABLE 2-continued

| Bearing grease | Sealing grease | Torque | Endurance life | Remarks |
|---|---|---|---|---|
| A | B | Reduced | Moderate | — |
| A | C | Reduced | Inferior | — |

From these experiments, it was found that it is possible to provide a seal that can reduce the frictional torque of the sealing lips. Thus, this reduces the rotational torque of the seal while keeping the bearing performance. Also, the sealing grease is not mixed with the bearing grease. This suppresses the flowability of the sealing grease by applying sealing grease on the sliding portions of sealing lips which includes the same thickener as that of the bearing grease and has a worked penetration of 350 or less and a kinematic viscosity of base oil at 40° C. of 70% or less than that of the bearing grease. If the worked penetration exceeds 350, it is believed that the sealing grease would be scattered by centrifugal force. Thus, it is preferable to set the worked penetration to 350 or less to apply moderate self-holding power to the sealing grease. In addition, in order to reduce the rotational torque of the wheel bearing apparatus, the kinematic viscosity of base oil at 40° C. is set to 70% or less than that of the bearing grease.

In addition, it is possible to suppress an increase in the starting torque of the outer-side seal 8 due to the high viscosity or solidification of base oil at a temperature below its freezing point by using sealing grease including base oil formed of a mixture of mineral oil and synthetic oil. Furthermore, it is possible to adjust the pour point of base oil to a predetermined temperature range (−65~−12.5° C.) by adding pour point depressant to the sealing grease. The lower the pour point of base oil, the higher the ability of the oil to remain in its flowability state. Sealing grease that has a pour point of −12.5° C. can be used for a severe cold area. For example, sealing grease of its base oil, having a pour point of about −5° C., would be solidified in Hokkaido area (Japan) and cannot be used. Accordingly −65° C. is a pour point where the sealing grease can be used. Some troubles may occur in severe cold area if the pour point is higher than −12.5° C.

The wheel bearing apparatus is sometimes used in environments where rain water or muddy water can enter into the bearing. Thus, sealing grease is used where saturated moisture is controlled by blending dispersant for dispersing water as fine particles into the sealing grease. That is, it can be appreciated that formation of an oil film of sealing grease cannot be prevented. Thus, endurance life of the bearing will be improved since the saturated moisture of the sealing grease is controlled. Water infiltrated into the sealing grease can be dispersed into the sealing grease as fine particles. The water is confined in the grease of a continuous phase. The present disclosure is based on knowledge that particularly high oil film formation can be obtained when the saturated moisture of the sealing grease is in a range of 30~60% by weight, more preferably of 40~50% by weight.

When water has infiltrated into sealing grease, it is believed that the formation of an oil film would be spoiled in grease where saturated moisture is less than 30% by weight. Grease where the saturated moisture exceeds 60% by weight is believed that metal-to-metal contact will exist or the generation of rust would be caused. Since the oil film can be formed when the saturated moisture is in a range of 30~60% by weight, metal-to-metal contact will rarely occur. Thus, the generation of rust will be prevented. Accordingly, it is possible to keep the lubricating performance in rolling contact portions and sliding performance of the sealing grease 15. Thus, this reduces the frictional torque of sealing lips. In the present disclosure, the saturated moisture (% by weight) is defined as follows: saturated moisture (% by weight)=(max. moisture dispersible in grease×100)/(weight of grease+max. moisture dispersible in grease).

In the present disclosure, it is possible to use surface active agent as the dispersant to control saturated moisture in the sealing grease 15. The surface active agent can be used to disperse water infiltrated into the grease. This makes the water harmless to prevent oil film breakage and the generation of rust even if the water has infiltrated into bearing portions and the seal 8. The water infiltrated into sealing grease is changed to fine water particles by a surface active agent and dispersed into the sealing grease. Since grease can exist as a continuous phase, it is appreciated that oil film breakage is not caused. Examples of the surface active agents are based on polyalkylene glycol, carboxylic acid alkylene glycol, carboxylic acid polyalkylene glycol etc. Generation of rust at lip sliding portions can be effectively suppressed by mixing preservatives such as sulfonates, esters etc. with sealing grease 15.

As shown in an enlarged view of FIG. 3, the inner-side seal 9 is formed as a composite seal or a so-called "pack seal". It has an annular sealing plate 16 and an annular slinger 17. Each has a substantially "L"-shaped longitudinal section and is arranged opposite to one another.

The annular sealing plate 16 includes a metal core 18. The metal core 18 is adapted to be press-fit into the inner circumference of the inner-side end of the outer member 10. A sealing member 19 is integrally adhered to the metal core 18, via vulcanizing adhesion. The metal core 18 is press-formed of a ferritic stainless steel sheet, an austenitic stainless steel sheet or a preserved cold rolled steel sheet. It has a substantially L-shaped longitudinal section. The metal core 18 has a cylindrical fitting portion 18a, to be press-fit into the outer member 10, and a radial portion 18b. The radial portion 18b extends radially inward from the end of the fitting portion 18a. The inner-side tip end of the fitting portion 18a of the metal core 18 is thinned. The sealing member 19 is adhered to the metal core 18 so that it covers the external surface of the metal core 18 from its radial portion 18b to fitting portion 18a to form a so-called half metal structure.

Similarly to the metal core 18, the slinger 17 is also press-formed of a ferritic stainless steel sheet, an austenitic stainless steel sheet or a preserved cold rolled steel sheet. It has a substantially L-shaped longitudinal section and includes a cylindrical portion 17a, to be press-fit into the inner ring 3, and a standing portion 17b. The standing portion 17b extends radially outward from the end of the cylindrical portion 17a. The outer circumferential edge of the standing portion 17b of the slinger 17 is arranged to oppose the sealing plate 16, via a slight radial gap, to form a labyrinth seal 20.

The sealing member 19 is formed from synthetic rubber such as NBR. It has a side lip 19a, grease lip 19b and dust lip 16c. The side lip 19a is in sliding contact with an outer-side surface of the standing portion 17b of the slinger 17. The grease lip 19b and dust lip 19c are formed in a forked configuration at a radially inward position of the side lip 19a. The grease lip 19b and dust lip 19c slidingly contact the outer circumference of the cylindrical portion 17a of the slinger 17.

Sealing grease 15 is applied to a space between the side lip 19a and the dust lip 19c and a space between the dust lip 19c and the grease lip 19b. Similarly to the outer-side seal 8, the sealing grease 15 is formed from grease different from that of the bearing grease. Also in this inner-side seal 9, it is possible to reduce the frictional torque of the lips. Thus, the rotational torque of the seal 9 is reduced by using the sealing grease 15 formed from grease different from that of the bearing grease and by setting the kinematic viscosity of base oil of the sealing grease at 40° C. to 70% or less of that of the bearing grease at 40° C.

Figure 4:
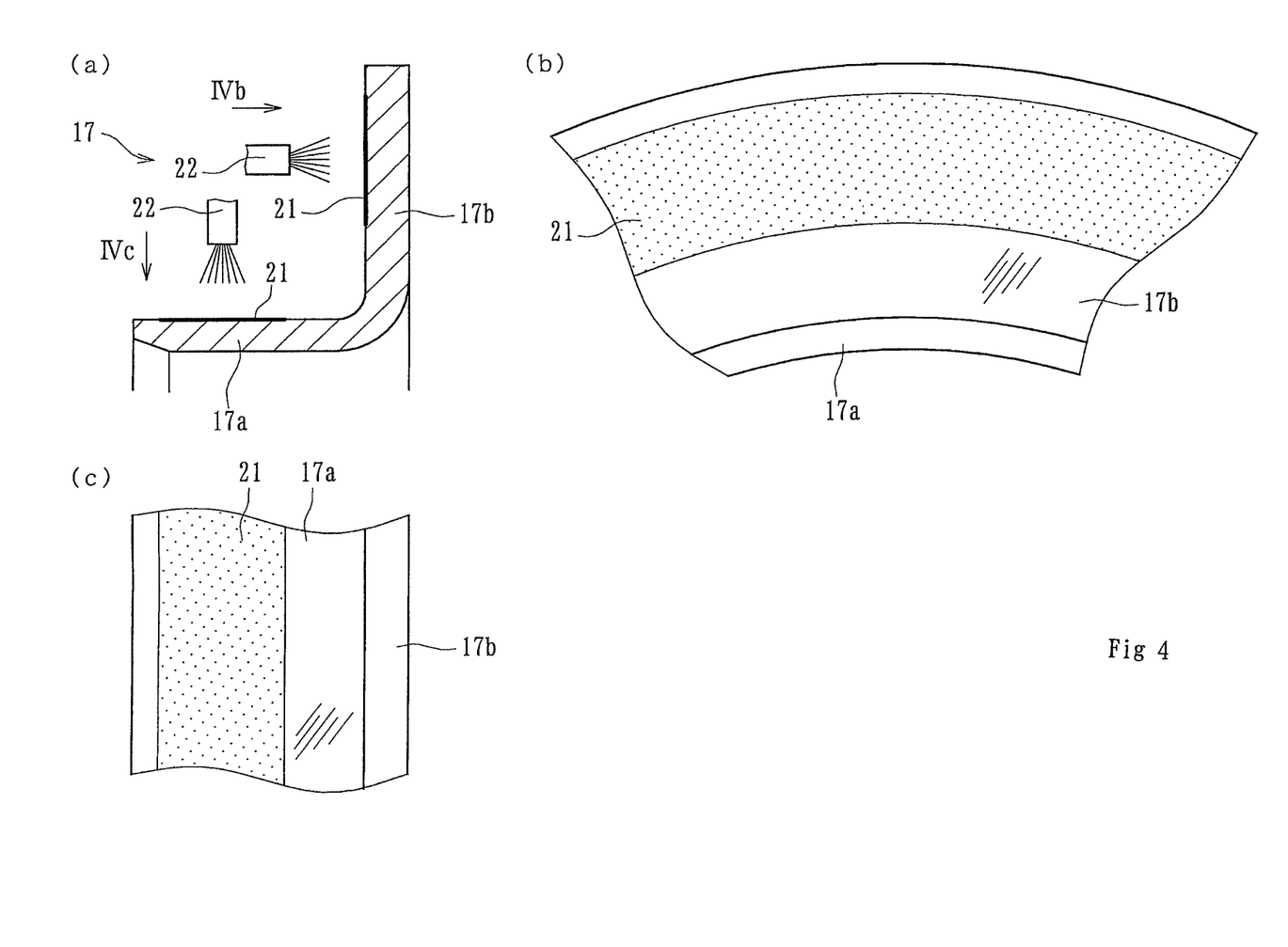
FIG. 4(a) is an explanatory partially enlarged sectional view of a slinger of FIG. 3.
FIG. 4(b) is an explanatory partially enlarged view taken along an arrow IVb in FIG. 4(a).
FIG. 4(c) is an explanatory partially enlarged view taken along an arrow IVc in FIG. 4(a).

Further according to the present disclosure, innumerable dimples 21 are formed on the lip sliding surfaces of the slinger 17 by a shot blast treatment, as schematically shown in FIG. 4. The dimples 21 may be formed on the surface of the base portion 11 of the wheel mounting flange 4. The sealing lips of the outer-side seal 8 engage the base portion 11 with the dimples 21. As shown in FIG. 4(a), the shot blast is performed by first placing the slinger 17 on a rotary jig (not shown). Next, media, such as steel beads, is blast onto the surfaces of the slinger 17. A shot blasting nozzle 22 is pointed at the slinger 17. The rotary jig is rotated. One example of the shot blasting is carried out by moving the nozzle 22 within a predetermined range under conditions where beads diameter of 20~100 μm, blasting duration of about 90 seconds and blasting pressure of 1~3 kg/cm$^2$.

The steel sheet forming the slinger 17 usually has a surface roughness of a maximum height Rz 2.4 or less. It is roughened by shot blasting to a maximum height of Rz 1~9. The maximum height Rz is one of the roughness shape parameter of JIS (JIS B 0601-2001). It is defined as a sum of a maximum value and a minimum value from an average line in values sampled from a reference line.

When innumerable dimples 21 are previously formed on the sliding surface of the slinger 17, the lubricating power is improved. Thus, sliding resistance of lips and the rotational torque is reduced. In addition, it is possible to increase grease holding power due to an increase of surface area by the dimples. Thus, this improves the sealability and durability of the seal for a long term due to the suppression of wear of sealing lips and suppression of heat generation of lip sliding portions.

The present disclosure can be applied to wheel bearing apparatus of the first through third generations of the inner ring rotation type.

The present disclosure has been described with reference to the preferred embodiment. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A vehicle wheel bearing apparatus comprising:
an outer member formed with double row outer raceway surfaces on an inner circumference of the outer member;
an inner member including a wheel hub and at least one inner ring, the wheel hub is integrally formed on one end with a wheel mounting flange, a cylindrical portion axially extends from the wheel mounting flange, the inner ring is press-fit onto the cylindrical portion of the wheel hub, and double row inner raceway surfaces are formed on outer circumferences of the wheel hub and the inner ring, the inner raceway surfaces oppose, respectively, the double row outer raceway surfaces;
double row rolling elements are freely rollably contained between the inner raceway surfaces of the inner member and the outer raceway surfaces of the outer member;
seals are mounted within annular openings formed between the outer member and the inner member;
at least one seal of the seals includes a metal core press-formed from a steel sheet with a cylindrical fitting portion and a radial portion, the cylindrical fitting portion is adapted to be press-fit into the inner circumference of an end of the outer member, via a predetermined interference, the radial portion extends radially inward from the end of the outer member;
a sealing member of synthetic rubber is formed with a plurality of sealing lips, the sealing member is integrally adhered to the fitting portion of the metal core by vulcanizing adhesion;
bearing grease is contained within the vehicle wheel bearing apparatus in a sealed manner, sealing grease is applied to sliding portions of the sealing lips, both the bearing grease and the sealing grease use a same thickener and a worked penetration of 350 or less; and
kinematic viscosity of base oil of the sealing grease at 40° C. is set to 70% or less of that of the bearing grease at 40° C. to reduce the rotational torque of the seals of the wheel bearing apparatus.

2. The vehicle wheel bearing apparatus of claim 1, wherein the bearing grease comprises an urea-base thickener and the kinematic viscosity of base oil of the bearing grease at 40° C. is set in a range of 30~170 mm$^2$/s.

3. The vehicle wheel bearing apparatus of claim 1, wherein a pour point of base oil of the sealing grease is adjusted to a range of −65~−12.5° C.

4. The vehicle wheel bearing apparatus of claim 3, wherein the pour point of base oil is adjusted by mixing mineral oil and synthetic oil.

5. The vehicle wheel bearing apparatus of claim 3, wherein the pour point of the base oil is adjusted by adding pour point depressant to the base oil.

6. The vehicle wheel bearing apparatus of claim 1, wherein saturated moisture of the sealing grease is set in a range of 30~60% by weight.

7. The vehicle wheel bearing apparatus of claim 1, wherein mating surfaces of members that engage the sealing lips are roughened to a maximum height Rz 5~20.

8. The vehicle wheel bearing apparatus of claim 1, wherein mating surfaces of members engaging the sealing lips are formed with dimples by a shot blast treatment and roughened to a range of maximum height Rz 1~9.

9. The vehicle wheel bearing apparatus of claim 1, wherein the sealing member is adhered to the metal core so that it covers an external surface of the metal core from the radial portion to fitting portion and forms an annular projection, the annular projection has an outer diameter gradually increasing toward an outer-side end of the outer member so as to have a tapered outer surface of a predetermined inclined angle (α) and a predetermined projected height (δ) larger than an outer diameter of the fitting portion of the metal core.

10. The vehicle wheel bearing apparatus of claim 1, wherein an inner-side tip end of the fitting portion of the metal core is thinned, and the sealing member is adhered to the metal core so that it covers an external surface of the metal core from the radial portion to fitting portion.

* * * * *

UNITED STATES PATENT AND TRADEMARK OFFICE
CERTIFICATE OF CORRECTION

PATENT NO. : 9,623,703 B2
APPLICATION NO. : 14/452881
DATED : April 18, 2017
INVENTOR(S) : Yasushi Shibata It is certified that error appears in the above-identified patent and that said Letters Patent is hereby corrected as shown below:

In the Specification

Column 4
Line 5             "30~470mm$^2$/s" should be --30~170mm$^2$/s--.

Signed and Sealed this
First Day of August, 2017

Joseph Matal
*Performing the Functions and Duties of the
Under Secretary of Commerce for Intellectual Property and
Director of the United States Patent and Trademark Office*